US012804524B2

(12) United States Patent
Kang et al.

(10) Patent No.: US 12,804,524 B2
(45) Date of Patent: Nov. 17, 2026

(54) METHOD AND APPARATUS FOR MOBILITY MANAGEMENT OF TERMINAL CONNECTED TO INTEGRATED ACCESS BACKHAUL IN WIRELESS COMMUNICATION SYSTEM

(71) Applicant: ELECTRONICS AND TELECOMMUNICATIONS RESEARCH INSTITUTE, Daejeon (KR)

(72) Inventors: Sook Yang Kang, Daejeon (KR); You Sun Hwang, Daejeon (KR); Hyung Deug Bae, Daejeon (KR); Jae Wook Shin, Daejeon (KR); Sung Min Oh, Daejeon (KR); Soon Yong Lim, Daejeon (KR); Sung Gu Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 328 days.

(21) Appl. No.: 18/505,426

(22) Filed: Nov. 9, 2023

(65) Prior Publication Data

US 2024/0163779 A1 May 16, 2024

(30) Foreign Application Priority Data

Nov. 10, 2022 (KR) ........................ 10-2022-0149935

(51) Int. Cl.
*H04W 24/10* (2009.01)
*H04W 48/16* (2009.01)
*H04W 84/04* (2009.01)

(52) U.S. Cl.
CPC ........... *H04W 48/16* (2013.01); *H04W 24/10* (2013.01); *H04W 84/047* (2013.01)

(58) Field of Classification Search
CPC .............................. H04W 48/16; H04W 24/10
USPC .......................................................... 455/434
See application file for complete search history.

(56) References Cited

U.S. PATENT DOCUMENTS

| | | | | |
|---|---|---|---|---|
| 2021/0195674 | A1* | 6/2021 | Park | H04W 76/18 |
| 2021/0360439 | A1 | 11/2021 | Akl et al. | |
| 2022/0132381 | A1 | 4/2022 | Novlan et al. | |
| 2022/0132432 | A1 | 4/2022 | Kim et al. | |

(Continued)

FOREIGN PATENT DOCUMENTS

| | | | |
|---|---|---|---|
| WO | 2021/239138 | A1 | 12/2021 |
| WO | 2022/149880 | A1 | 7/2022 |

OTHER PUBLICATIONS

Qualcomm Incorporated, “Enhancements for mobility of IAB-node and its served UEs”, 3GPP TSG-RAN WG3 Meeting #117bis electronic, R3-225360, Online, Oct. 10-18, 2022.

*Primary Examiner* — Qutbuddin Ghulamali
(74) *Attorney, Agent, or Firm* — LRK PATENT LAW FIRM

(57) ABSTRACT

A method of a terminal, according to an exemplary embodiment of the present disclosure, may include: requesting access to a mobile integrated access backhaul (IAB) based on cell search; receiving a tracking area (TA) update procedure stop request message from an Access and Mobility Management Function (AMF) of a core network; and deactivating a TA update procedure based on the TA update procedure stop request message.

9 Claims, 16 Drawing Sheets

(56) References Cited

U.S. PATENT DOCUMENTS

| | | | | |
|---|---|---|---|---|
| 2022/0183105 | A1 | 6/2022 | Muhammad et al. | |
| 2022/0217570 | A1 | 7/2022 | Akl et al. | |
| 2022/0272564 | A1* | 8/2022 | Teyeb | H04W 28/0263 |
| 2022/0286922 | A1* | 9/2022 | Chen | H04L 63/101 |
| 2023/0007509 | A1 | 1/2023 | Cao et al. | |
| 2023/0084683 | A1* | 3/2023 | Chun | H04W 4/90<br>455/434 |
| 2024/0049086 | A1* | 2/2024 | Ishii | H04W 36/0072 |
| 2024/0089837 | A1* | 3/2024 | Akl | H04W 48/16 |
| 2024/0236680 | A1* | 7/2024 | Chun | H04W 36/0064 |
| 2024/0406188 | A1* | 12/2024 | Tiwari | H04W 12/06 |

* cited by examiner

100

METHOD AND APPARATUS FOR MOBILITY MANAGEMENT OF TERMINAL CONNECTED TO INTEGRATED ACCESS BACKHAUL IN WIRELESS COMMUNICATION SYSTEM

CROSS-REFERENCE TO RELATED APPLICATION(S)

This application claims priority to Korean Patent Application No. 10-2022-0149935, filed on Nov. 10, 2022, with the Korean Intellectual Property Office (KIPO), the entire contents of which are hereby incorporated by reference.

BACKGROUND

1. Technical Field

Exemplary embodiments of the present disclosure relate to a mobility management technique for a terminal in a wireless communication system, and more specifically, to a mobility management technique of an integrated access backhaul (IAB) node in a wireless communication system.

2. Description of Related Art

The integrated Access and Backhaul (IAB) enables wireless relay functions of the Next Generation Radio Access Network (NG_RAN) and provides access functions to a plurality of terminals through New Radio (NR). Additionally, the IAB supports backhauling for connecting to IAB nodes through multiple hops and connecting to a core network. In other words, each of the IAB nodes supports base station (gNB)-distributed unit (DU) functions and has an NR access interface connected to a user equipment (UE) and an IAB node of the next hop.

In addition, the IAB node may be connected to other IAB nodes or IAB-donors and to the network. For these connections, the IAB node may include an IAB-Mobile Terminal (MT) function having a physical layer, radio resource control (RRC), and non-access stratum (NAS) function.

An endpoint for connection with the network may be referred to as an IAB donor, and the IAB donor may be composed of a control unit (CU) and a data unit (DU). The IAB donor CU, which is an endpoint of the core network, may perform functions such as centralized resource management and path management for each IAB node.

The IAB with mobility may be referred to as a mobile IAB, and the mobile IAB can accommodate dynamically changing topologies. Even when a topology changes dynamically, the mobile IAB needs to be able to track a location of a terminal connected to the mobile IAB and provide continuous services thereto.

When the topology of the current mobile IAB is dynamically changed, changes in location information of the mobile IAB and terminals connected to the mobile IAB may occur at once. Accordingly, handover and location information change procedures may need to be performed simultaneously for the terminal(s) connected to the mobile IAB. When the topology of the mobile IAB is dynamically changed, a large amount of signals may be generated to perform the handover and location information change procedures for the terminal(s) connected to the mobile IAB. In other words, many network resources are temporarily used simultaneously for the handover and location information change procedures of the terminal(s), which may cause a large load. This type of load may result in signal loss, which may lead to service interruption.

SUMMARY

Exemplary embodiments of the present disclosure are directed to providing a method and an apparatus for management mobility of a terminal connected to a mobile IAB.

According to a first exemplary embodiment of the present disclosure, a method of a terminal may comprise: requesting access to a mobile integrated access backhaul (IAB) based on cell search; receiving a tracking area (TA) update procedure stop request message from an Access and Mobility Management Function (AMF) of a core network; and deactivating a TA update procedure based on the TA update procedure stop request message.

The method may further comprise: receiving a TA update procedure resumption message from the mobile IAB; and activating the TA update procedure.

The method may further comprise: receiving a measurement stop indication message from an IAB donor control unit (CU) to which the mobile IAB is connected; and in response to receiving the measurement stop indication message, deactivating a measurement procedure for measuring a strength of a signal received from a cell to which the terminal is connected and measuring a strength of a signal received from an adjacent cell.

The method may further comprise: receiving a measurement control message indicating to resume measurement from the mobile IAB; and in response to that measurement is indicated to be resumed, activating the measurement procedure.

The method may further comprise: receiving, from the mobile IAB, a system information block (SIB) in which at least one of a base station identifier (gNB id) or a cell identifier (Cell Id) is changed; receiving a paging signal from the mobile IAB; and in response to receiving the paging signal, performing a TA update based on the SIB.

The performing of the TA update may update at least one of cell information or tracking area code (TAC) information of the mobile IAB.

The method may further comprise: in response to receiving a paging signal from the mobile IAB, performing a call setup procedure through the mobile IAB.

According to a second exemplary embodiment of the present disclosure, a terminal may comprise at least one processor, and the at least one processor may cause the terminal to perform: requesting access to a mobile integrated access backhaul (IAB) based on cell search; receiving a tracking area (TA) update procedure stop request message from an Access and Mobility Management Function (AMF) of a core network; and deactivating a TA update procedure based on the TA update procedure stop request message.

The at least one processor may further cause the terminal to perform: receiving a measurement stop indication message from an IAB donor control unit (CU) to which the mobile IAB is connected; and in response to receiving the measurement stop indication message, deactivating a measurement procedure for measuring a strength of a signal received from a cell to which the terminal is connected and measuring a strength of a signal received from an adjacent cell.

The at least one processor may further cause the terminal to perform: in response to receiving a TA update procedure resume message from the mobile IAB, activating the TA update procedure; and in response to receiving a measurement control message indicating to resume measurement from the mobile IAB, activating the measurement procedure.

The at least one processor may further cause the terminal to perform: receiving, from the mobile IAB, a system information block (SIB) in which at least one of a base station identifier (gNB id) or a cell identifier (Cell Id) is changed; receiving a paging signal from the mobile IAB; and in response to receiving the paging signal, performing a TA update based on the SIB.

The at least one processor may further cause the terminal to perform: updating at least one of cell information or tracking area code (TAC) information of the mobile IAB, when performing the TA update.

According to a third exemplary embodiment of the present disclosure, a method of an integrated access backhaul (IAB) may comprise: performing a radio resource control (RRC) setup procedure with a first mobile IAB; performing a registration procedure of the first mobile IAB with an access and mobility management function (AMF) of a core network; registering a first terminal with the AMF to be onboarded with the first mobile IAB when the first terminal is connected to the first mobile IAB; transmitting a tracking area (TA) update procedure stop request message to the first terminal; and transmitting a measurement stop indication message to the first terminal.

The method may further comprise: receiving a measurement report of the first mobile IAB; performing a release procedure of terminal(s) connected to the first mobile IAB with the AMF, when the measurement report satisfies a preset condition; and transmitting a TA update procedure resumption message and a measurement control message indicating to resume measurement to the first terminal connected to the first mobile IAB.

The preset condition may be a case when a location of the first mobile IAB is a specific location or a case when a speed of the first mobile IAB falls below a preset speed.

The method may further comprise: in response to receiving a paging request message, extracting information on the first mobile IAB and information on the first terminal, which are included in the paging request message; and transmitting a paging request message for the first terminal to the first mobile IAB based on the information on the first mobile IAB.

The method may further comprise: when migrating a second IAB connected to a second terminal, performing an F1 setup and a cell activation procedure with the second IAB; performing a location information change procedure of the second IAB; and indicating the second IAB to transmit a paging signal for TA update of the second terminal connected to the second IAB.

The method may further comprise: changing a new radio (NR) Cell Global Identity (NCGI) of the second mobile IAB, when performing the F1 setup and the cell activation procedure with the second IAB.

The NCGI may comprise a base station identifier (gNB ID) and a cell identifier (Cell ID).

According to exemplary embodiments of the present disclosure, the mobile IAB can perform measurement and mobility management procedures on behalf of boarding terminals, and increase the utilization of radio resources by preventing redundant measurement information and mobility management signals. It also has the advantage of preventing signal explosion. In addition, paging with the boarding terminals can be managed on a mobile IAB unit group basis, which has the advantage of preventing waste of resources for paging signals and easily finding the location of the terminal.

DETAILED DESCRIPTION OF THE EMBODIMENTS

Figure 1:
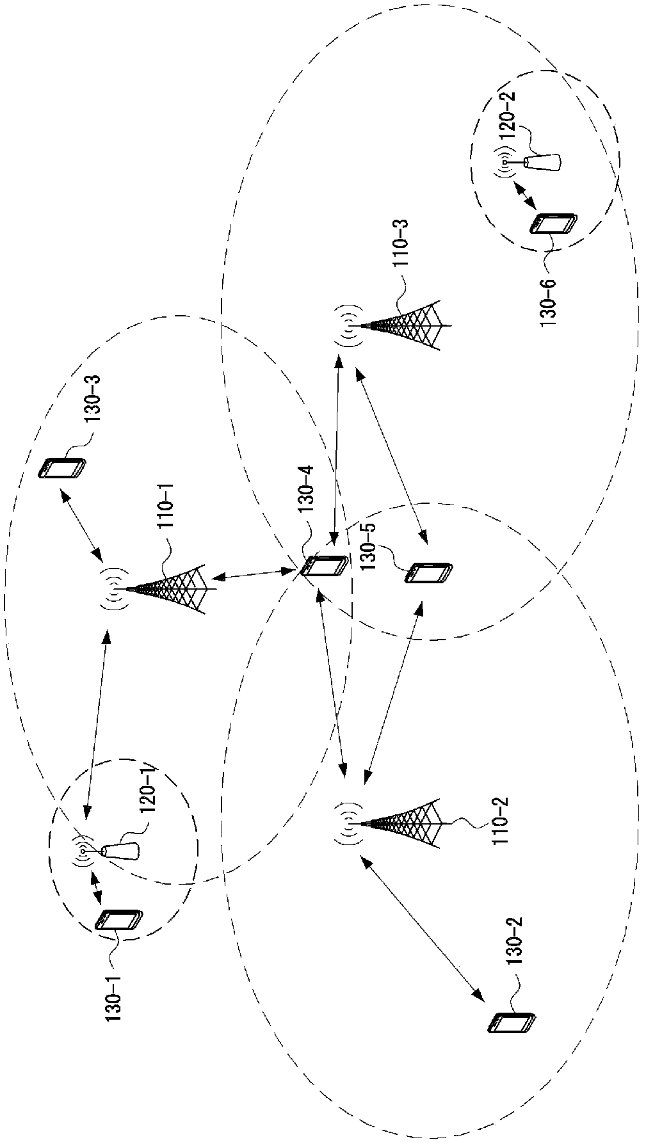
FIG. 1 is a conceptual diagram illustrating an exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and redundant descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g. long term evolution (LTE), LTE-advanced (LTE-A)), 5th generation (5G) communication (e.g. new radio (NR)), or the like. The 4G communication may be performed in a frequency band of 6 gigahertz (GHz) or below, and the 5G communication may be performed in a frequency band of 6 GHz or above as well as the frequency band of 6 GHz or below.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
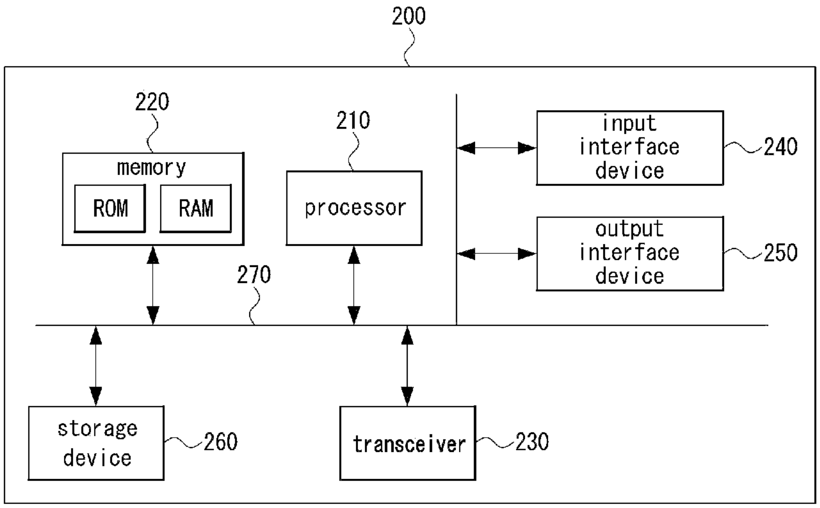
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g. a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g. a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g. transmission or reception of a signal) performed at a first communication node among communication nodes is described, the corresponding second communication node may perform a method (e.g. reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Meanwhile, in a communication system, a base station may perform all functions (e.g. remote radio transmission/reception function, baseband processing function, and the like) of a communication protocol. Alternatively, the remote radio transmission/reception function among all the functions of the communication protocol may be performed by a transmission and reception point (TRP) (e.g. flexible (f)-TRP), and the baseband processing function among all the functions of the communication protocol may be performed by a baseband unit (BBU) block. The TRP may be a remote radio head (RRH), radio unit (RU), transmission point (TP), or the like. The BBU block may include at least one BBU or at least one digital unit (DU). The BBU block may be referred to as a 'BBU pool', 'centralized BBU', or the like. The TRP may be connected to the BBU block through a wired fronthaul link or a wireless fronthaul link. The communication system composed of backhaul links and fronthaul links may be as follows. When a functional split scheme of the communication protocol is applied, the TRP may selectively perform some functions of the BBU or some functions of medium access control (MAC)/radio link control (RLC) layers.

As described above, when a topology of a current mobile IAB is dynamically changed, changes in location information of the mobile IAB and terminals connected to the mobile IAB may occur at once. Accordingly, handover and location information change procedures may need to be performed simultaneously for the terminal(s) connected to the mobile IAB. When the handover and location information change procedures are performed, a large amount of signals may be generated, which may cause a large load. This type of load may result in signal loss, which may lead to service interruption.

Therefore, the present disclosure is directed to providing methods for solving the above-described problem.

Movement of a mobile IAB from a parent IAB node to another IAB node may be referred to as 'migration', and this may be classified into two types as follows.

First, when inter-CU migration occurs, an initially-connected CU may maintain a connection with a new DU, and an IAB MT function may connect to a new CU to provide services, which is referred to as 'partial migration'. Second, a case where both an IAB DU and an IAB MT functions are connected to a new CU may be referred to as 'full migration'.

In both the first and second cases, whether to change or maintain an NR Cell Global Identity (NCGI) and a Tracking Area Code (TAC) for all UEs when connecting to the new CU is currently being discussed in the standardization process.

When a location of the mobile IAB is changed to a new TAC, if location change procedures are performed simultaneously for the terminals connected to the mobile IAB, it is disadvantageous in performing the location change procedures when a large number of terminals are connected to the mobile IAB. On the other hand, if the TAC is not changed for the terminals connected to the mobile IAB, the exact location information of the terminals cannot be known, which may have a disadvantage in paging the terminals.

Therefore, in the present disclosure described below, methods and apparatuses for preventing signal explosion that occurs when location information changes or handovers are individually performed for terminals (e/g. UEs) connected to the mobile IAB will be described. In the present disclosure, methods and apparatuses in which the mobile IAB performs mobility management functions on behalf of the terminals and the location information of the terminals is managed by the mobile IAB to accurately provide the locations of the terminals will be described.

Figure 3:
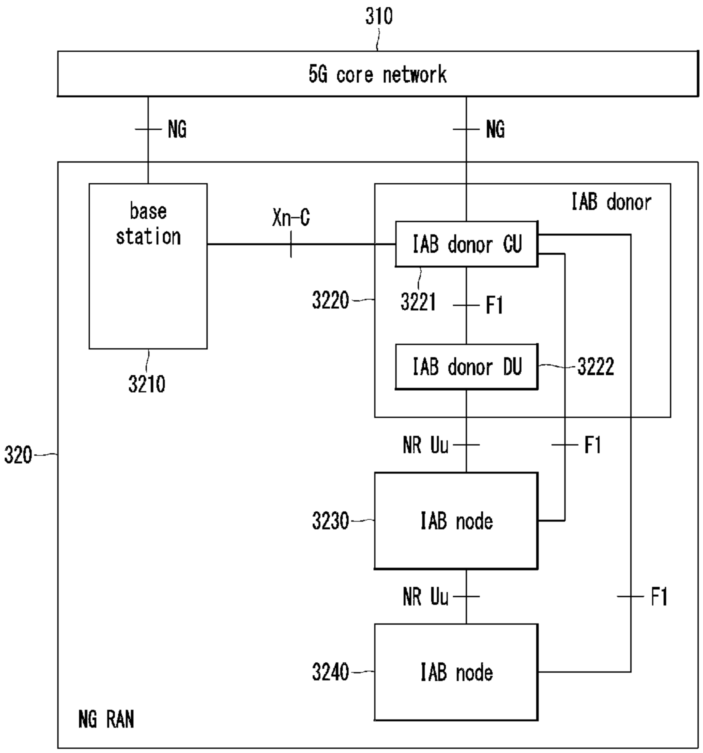
FIG. 3 is a conceptual diagram illustrating an IAB architecture according to the 3GPP specifications.

FIG. 3 is a conceptual diagram illustrating an IAB architecture according to the 3GPP specifications.

Referring to FIG. 3, the architecture may be composed of a 5G core network (5GC) 310 and an NG RAN 320 connected to the 5GC 310. The NG RAN 320 may include a base station (gNB) 3210, an IAB donor 3220, and other IAB nodes 3230 and 3240. The IAB donor 3220 may include an IAB donor CU 3221 and an IAB donor DU 3222.

The 5GC 310 and NG RAN 320 may be connected through an NG interface, and the 5GC 310 and the IAB donor 3220 may be connected through an NG interface. The base station 3210 and the IAB donor CU 3221 may be connected through an Xn-C interface, and the IAB donor CU 3221 and the IAB donor DU 3222 may be connected through an F1 interface. Additionally, the IAB donor CU 3221 and each of the IAB nodes 3230 and 3240 may be connected through an F1 interface. Additionally, the IAB donor DU 3222 and the IAB node 3230 may be connected through an NR Uu interface, and the IAB nodes 3230 and 3240 may be connected through an NR Uu interface.

In the configuration of FIG. 3, the NG RAN 320 may support IAB services through an IAB node called the IAB donor 3220, which is wirelessly connected to the base station 3210 capable of servicing the IAB nodes. As illustrated in FIG. 3, the IAB donor 3220 may be composed of the IAB donor CU 3221 and the IAB donor DU 3222. The IAB node may be connected to an upstream IAB node or IAB donor DU 3222 via a subset of UE functionality (i.e. IAB-MT) of the NR Uu interface. The IAB node may provide wireless backhaul to a downstream IAB node and UEs through network functions of the NR Uu interface (referred to as an IAB DU function of the IAB node).

The IAB donor CU 3221 and the IAB donor DU 3222 are connected through an F1 interface, the IAB donor CU 3221 and the IAB node 3230 or 3240 may connected through an F1 interface, and control data and user data are transferred through the F1 interfaces.

Figure 4A:
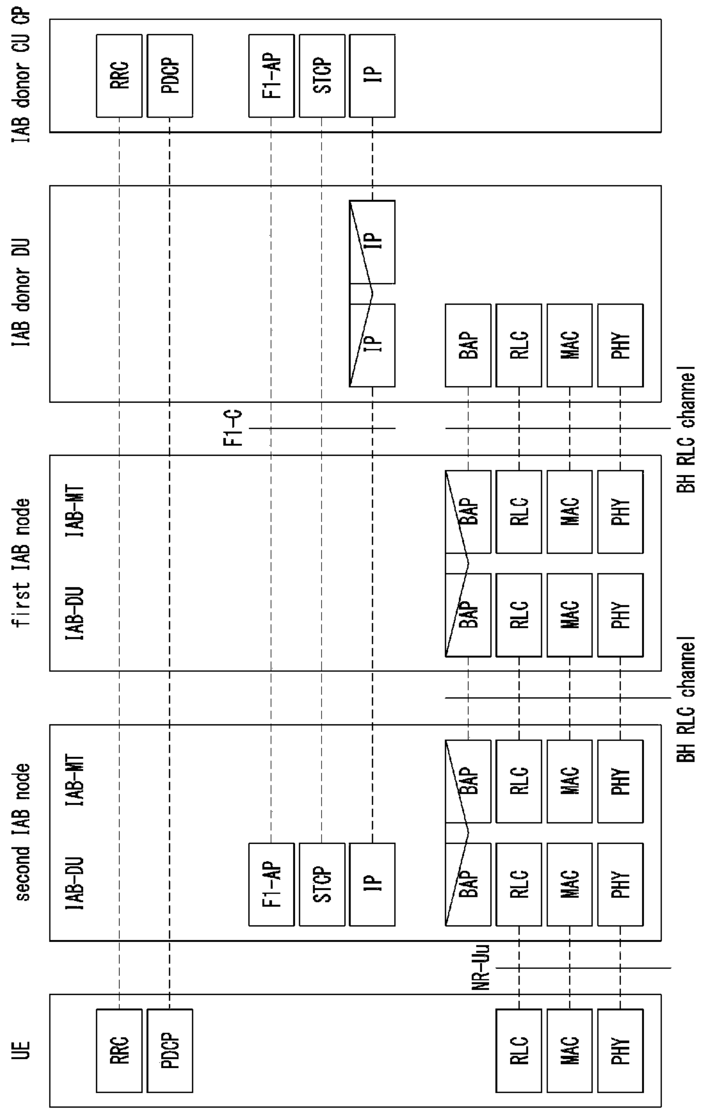
FIG. 4A is a conceptual diagram illustrating protocol stacks of a UE, IAB, and two-hop F1-C protocol.
Figure 4B:
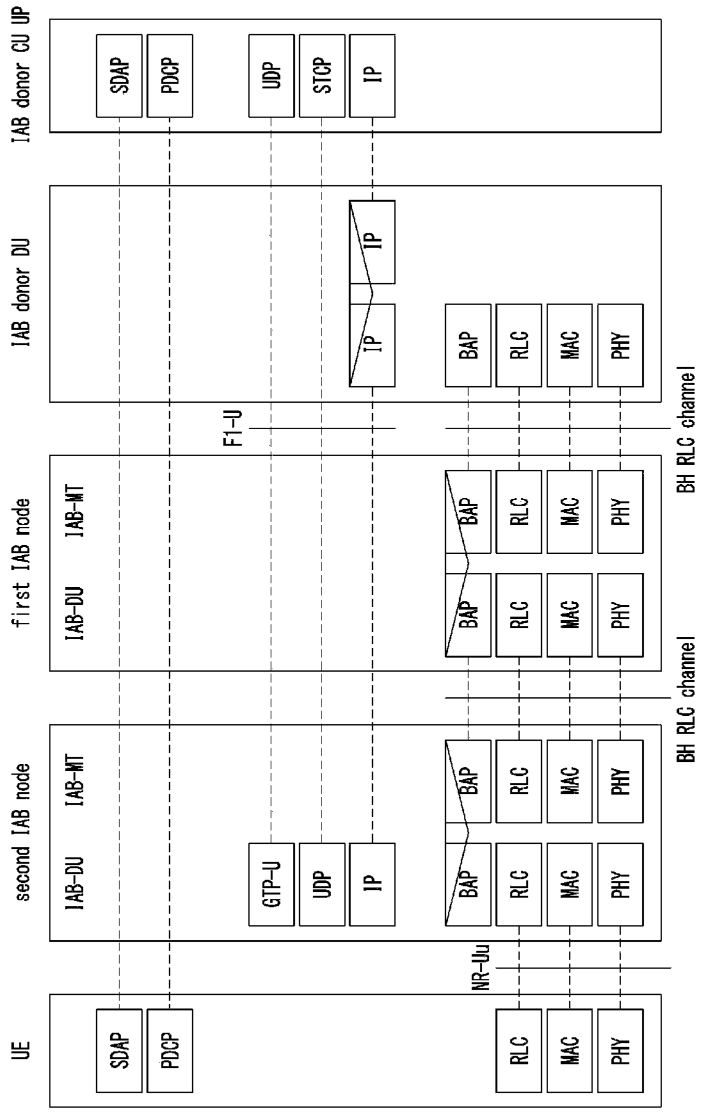
FIG. 4B is a conceptual diagram illustrating protocol stacks of a UE, IAB, and two-hop F1-U protocol.

FIG. 4A is a conceptual diagram illustrating protocol stacks of a UE, IAB, and two-hop F1-C protocol, and FIG. 4B is a conceptual diagram illustrating protocol stacks of a UE, IAB, and two-hop F1-U protocol.

In FIG. 4A, the remaining configuration except for the UE's protocol stack illustrates a protocol stack for an F1-C interface between the IAB DU and the IAB donor CU control plane (CP), which corresponds to an example of a case where traffic is delivered through two backhaul hops. The UE may be connected to the IAB donor through a second IAB node (i.e. IAB node 2) and a first IAB node (i.e. IAB node 1). That is, the second IAB node of FIG. 4A is connected to the IAB donor CU through F1-AP layers, and the F1-AP layers may manage routing between the IAB nodes. The UE connected to the second IAB node may have RRC and Packet Data Convergence Protocol (PDCP) interfaces with the IAB donor CP CU.

In FIG. 4B, the remaining configuration except for the UE's protocol stack illustrates a protocol stack for an F1-U interface between the IAB-DU and the IAB-donor CU user plane (UP), which corresponds to an example of a case where traffic is delivered through two backhaul hops. Similarly to FIG. 4A, the UE may be connected to the IAB donor through the second IAB node (i.e. IAB node 2) and the first IAB node (i.e. IAB node 1). In particular, Service Data Adaptation Protocol (SDAP) and PDCP layers may be configured between the UE and the IAB donor CU UP. The UE and IAB donor CU UP may be identical to the NR's UP protocol, and the IAB nodes connecting them may be routed through a backhaul adaptation protocol (BAP).

It should be noted that F1 in FIGS. 4A and 4B should be protected by security as described in the 3GPP specifications, and a security layer therefor is not illustrated in FIGS. 4A and 4B.

Figure 5:
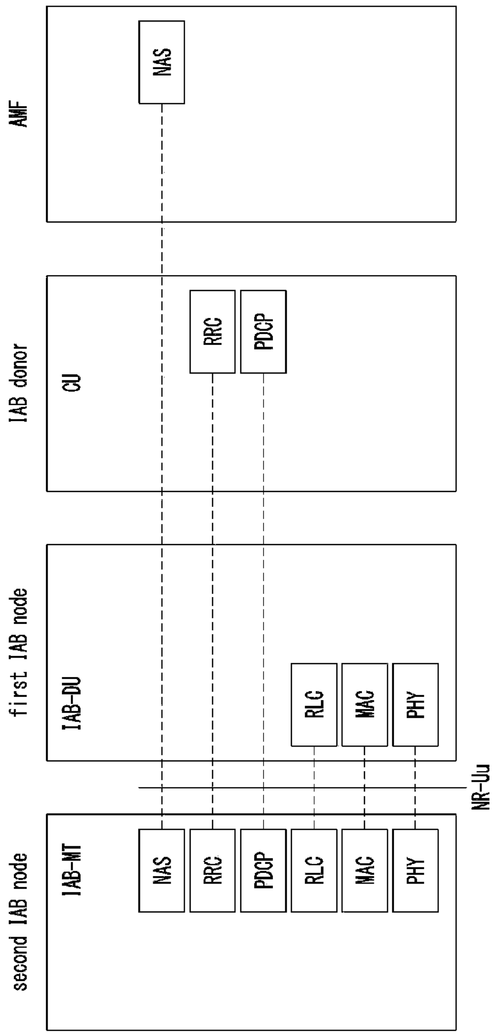
FIG. 5 is a conceptual diagram illustrating a protocol structure when an IAB node connects to a network while operating as an IAB MT.

FIG. 5 is a conceptual diagram illustrating a protocol structure when an IAB node connects to a network while operating as an IAB MT.

Referring to FIG. 5, the second IAB node (i.e. IAB node 2) exemplifies a protocol stack corresponding to the IAB MT, and the first IAB node (i.e. IAB node 1) exemplifies a protocol stack corresponding to the IAB DU. In addition, the IAB donor may include RRC and PDCP layers. The second IAB node may interface with an Access and Mobility Management Function (AMF) of the core network through the IAB donor CU, similarly to the terminal (e.g. UE). Therefore, the AMF may manage mobility of the second IAB node. In order to manage the mobility of the second IAB node, the AMF and the second IAB node may use a NAS protocol. Additionally, in order to manage the mobility of the second IAB node, RRC layers may be connected to interface with the IAB donor CU.

A procedure for connecting an IAB node will be described based on the protocol stacks and connection configurations of the IAB node described above.

Figure 6:
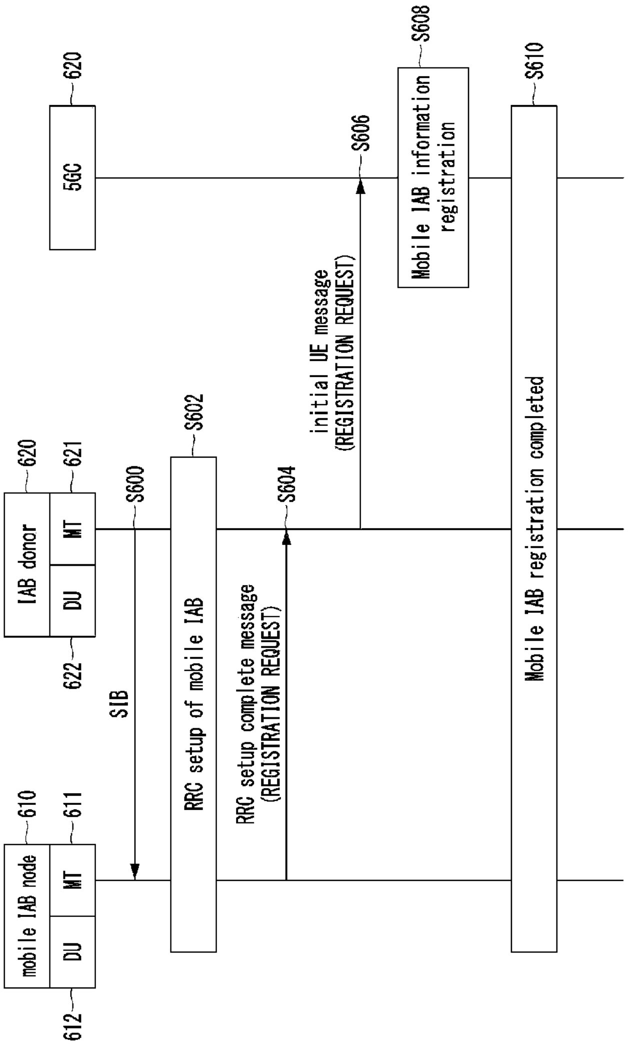
FIG. 6 is a sequence chart illustrating a setup procedure of a mobile IAB node with MT and DU.

FIG. 6 is a sequence chart illustrating a setup procedure of a mobile IAB node with MT and DU.

Referring to FIG. 6, a mobile IAB 610, an IAB donor 620, and a 5GC 630 are illustrated. The mobile IAB 610 may include an MT 611 and a DU 612, and the IAB donor 620 may include a CU 621 and a DU 622. The mobile IAB 610 and the IAB donor 620 illustrated in FIG. 6 may have the protocol stacks previously illustrated in FIGS. 3 to 6.

The MT 611 of the mobile IAB node 610 may establish an RRC connection in a radio section, and may register its own information using a NAS signal through a network interface with the 5GC 630.

In step S600, the MT 611 of the mobile IAB node 610 may receive a system information block (SIB) from the IAB donor 620, which is an upper IAB node. The SIB may include a PLMN identity information list (identity Info List), and the PLMN identity information list may include information on whether the upper node provides IAB functionality (e.g. IAB_supported). As illustrated in FIG. 6, the SIB may be information transmitted by the CU 621 of the IAB donor 620. Accordingly, the MT 611 of the mobile IAB node 610 may identify whether the IAB donor 620 provides IAB functionality based on the SIB transmitted by the IAB donor 620. FIG. 6 is a diagram assuming a case where the IAB donor 620 provides IAB functionality.

In step S602, the MT 611 of the mobile IAB node 610 may request access to the network by performing an RRC setup procedure with the CU 621 of the IAB donor 620 which is the upper IAB node.

In step S604, when the RRC setup is completed, the MT 611 of the mobile IAB node 610 may transmit an RRC setup complete (i.e. RRCSetupComplete) message to the IAB donor 620, that is, the CU 621 of the IAB donor 620. In this case, the MT 611 of the mobile IAB node 610 may indicate that it is an IAB node in the RRC setup complete message. Additionally, the MT 611 of the mobile IAB node 610 may transmit the RRC setup complete message including registration request information (REGISTRATION REQUEST) which is a NAS message. Accordingly, the CU 621 of the IAB donor 620 may identify that a node for which the RRC setup procedure has been performed is the mobile IAB node 610 based on the RRC setup complete message.

In step S606, the CU 621 of the IAB donor 620 may transmit an initial UE message (INITIAL UE MESSAGE) to the AMF (not shown in FIG. 6) of the 5GC 630 to register the mobile IAB node 610. The initial UE message may include the registration request information transmitted by the MT 611 of the mobile IAB node 610. Additionally, the CU 621 of the IAB donor 620 may indicate that the node requesting registration is a mobile IAB node based on the RRC setup complete message received from the mobile IAB node 610 in step S604. In other words, the initial UE message may include a parameter indicating that the node is a mobile IAB and the registration request information received from the MT 611 of the mobile IAB 610. Accordingly, in step S606, the AMF of the 5GC 630 may receive the initial UE message from the CU 621 of the IAB donor 620.

In step S608, the AMF may confirm that the node requesting registration is a mobile IAB node. Accordingly, the AMF may store registration information indicating that the corresponding node is a mobile IAB node.

In step S610, the AMF of the 5GC 630 may transmit a response message for the registration to the MT 611 of the mobile IAB node 610 through the IAB donor 620. This allows completion of the registration process.

According to the current 3GPP specifications, the RRC setup complete (RRCSetupComplete) message may include an IAB node indication parameter (e.g. lab-NodeIndication). In other words, the RRC setup complete message in step S604 is configured as shown in Table 1 below.

TABLE 1

| | | |
|---|---|---|
| RRCSetupComplete-v1610-IEs ::= | SEQUENCE { | |
| iab-NodeIndication-r16 | ENUMERATED {true} | OPTIONAL, |
| idleMeasAvailable-r16 | ENUMERATED {true} | OPTIONAL, |
| ... | | |

In addition, the IAB node indication may also be included in the initial UE message, which is a NAS transport message that the IAB donor 620 transmits to the AMF in step S606, as shown in Table 2 below.

TABLE 2

| information element (IE)/group name | presence | range | IE type and reference | description | importance | assigned importance |
|---|---|---|---|---|---|---|
| IAB Node Indication | O | | ENUMERATED (true, . . .) | indication of an IAB node | YES | reject |

The present disclosure proposes to include additional information other than the information exemplified in Tables 1 and 2. In other words, in order to express capability of movement for the mobile IAB, the present disclosure proposes adding the mobile IAB node indication as shown in Tables 3 and 4 below.

TABLE 3

```
RRCSetupComplete-v1610-IEs ::=  SEQUENCE {
   iab-NodeIndication-r16          ENUMERATED {true}        OPTIONAL,
   idleMeasAvailable-r16           ENUMERATED {true}        OPTIONAL,
   mobile iab-NodeIndication-r16     ENUMERATED {true}        OPTIONAL,
...
```

As exemplified in Table 3, the mobile IAB node indication (i.e. mobile iab-NodeIndication) parameter may be added to allow the IAB donor to identify that the corresponding node is a mobile IAB node at the RRC layer.

TABLE 4

| information element (IE)/group name | presence | range | IE type and reference | description | importance | assigned importance |
|---|---|---|---|---|---|---|
| IAB Node Indication | O | | ENUMERATED (true, . . .) | Indication of an IAB node | YES | reject |
| Mobile IAB Node Indication | O | | ENUMERATED (true, . . .) | Indication of a mobile IAB node | YES | reject |

As exemplified in Table 4, the mobile-IAB node indication parameter may be added so that the AMF can identify the mobile IAB. In addition, it may be indicated whether there is a capability of managing terminals connected to the mobile IAB node as a group. This may mean that terminals on board (connected to) the mobile IAB have the same location information as the mobile IAB. Accordingly, the AMF may be able to manage the mobile IAB and the terminals on board the mobile IAB together.

Figure 7A:
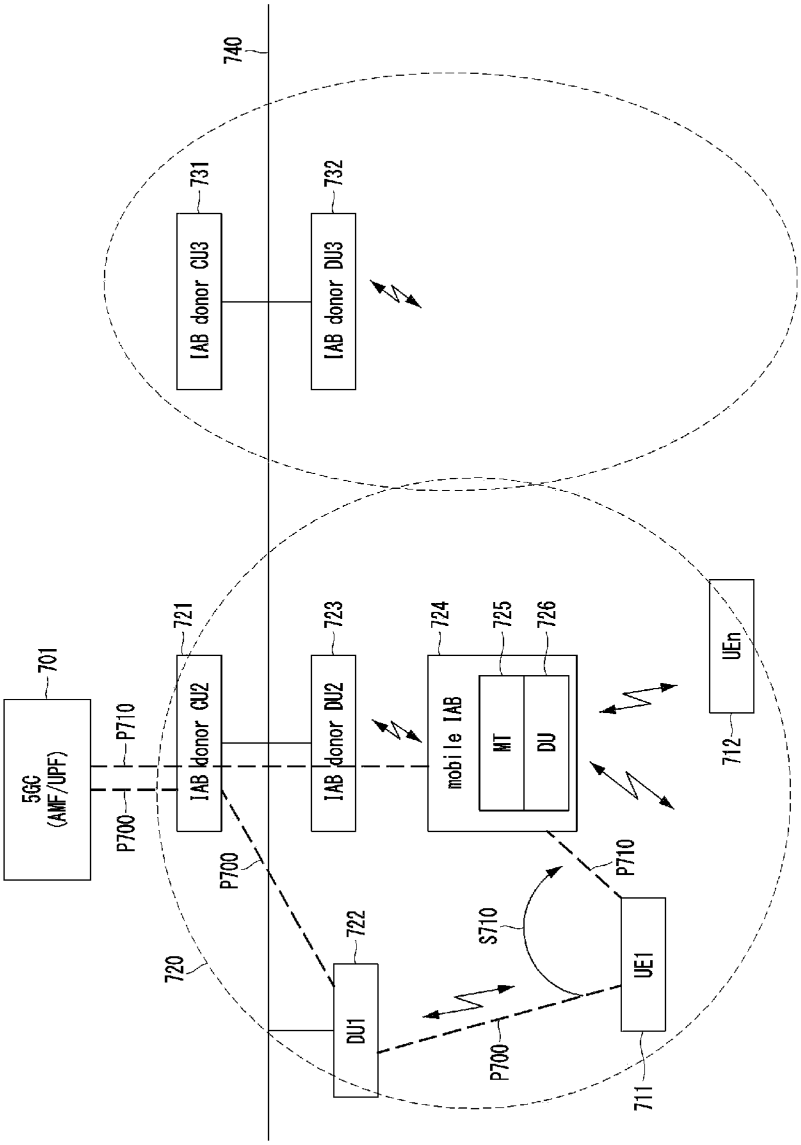
FIG. 7A is a conceptual diagram illustrating a scenario in which a UE connects to a mobile IAB.
Figure 7B:
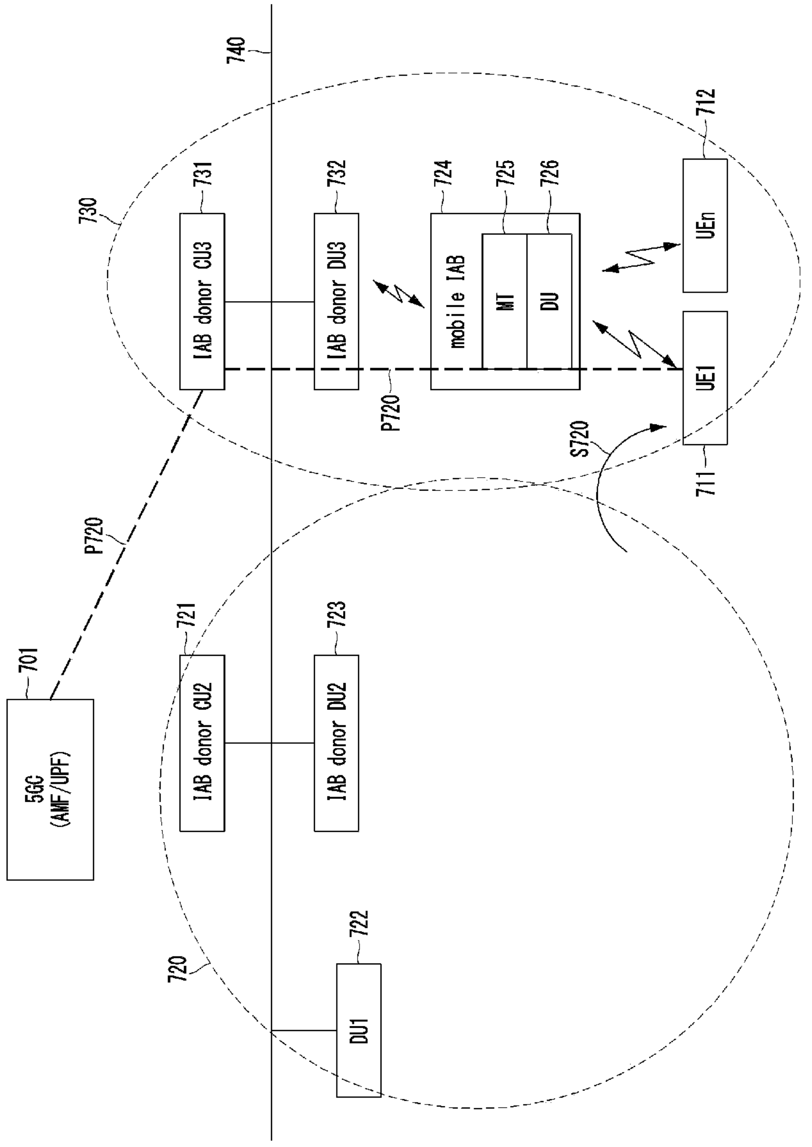
FIG. 7B is a conceptual diagram illustrating a scenario in which a mobile IAB on which a UE boards is changed.
Figure 7C:
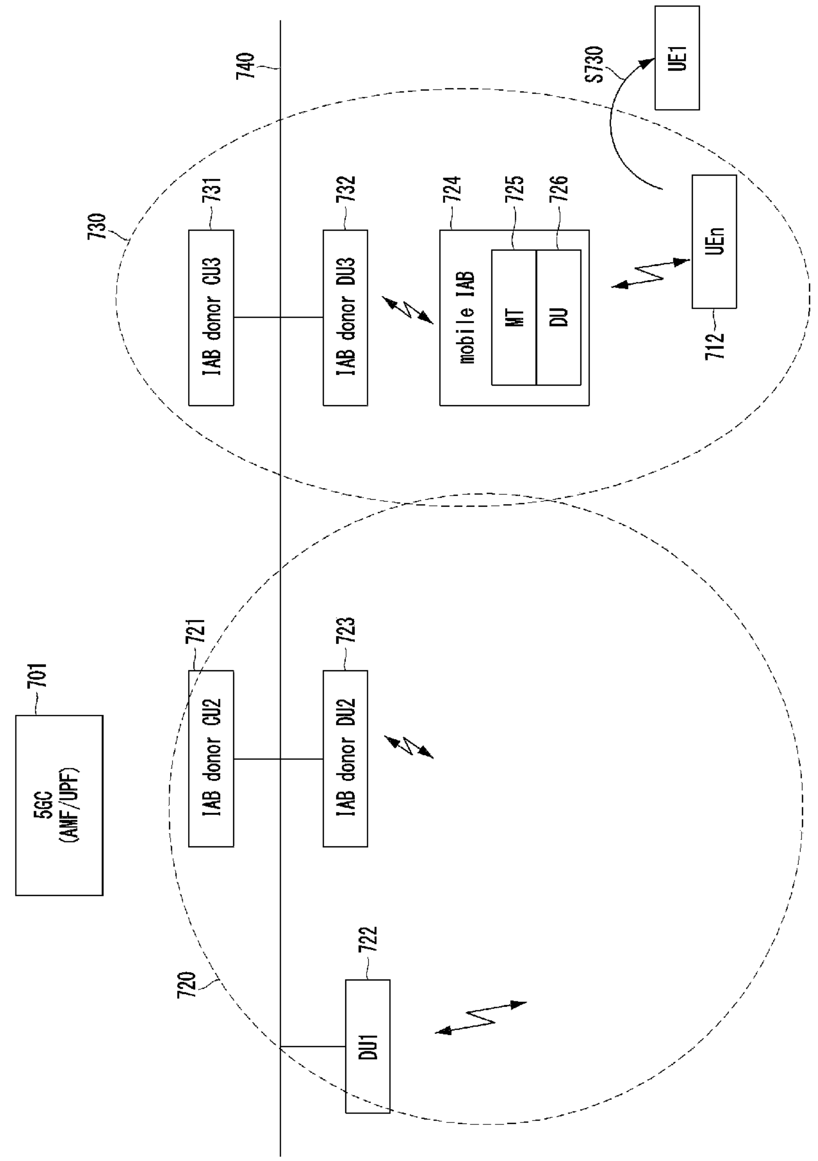
FIG. 7C is a conceptual diagram illustrating a scenario in which a UE gets off a mobile IAB.

FIG. 7A is a conceptual diagram illustrating a scenario in which a UE connects to a mobile IAB, FIG. 7B is a conceptual diagram illustrating a scenario in which a mobile IAB on which a UE boards is changed, and FIG. 7C is a conceptual diagram illustrating a scenario in which a UE gets off a mobile IAB.

Before describing FIGS. 7A to 7C, in the present disclosure, a mobile IAB may be an IAB that is mounted on various moving objects, such as Urban Air Mobility (UAM), trains, buses, etc., and moves together with the moving object. Therefore, the mobile IAB may be accessed by users, that is, UE(s) riding the moving object equipped with the mobile IAB, and provide services to the UE(s) riding the moving object equipped with the mobile IAB through connection to the network. Therefore, in the following description, the meaning of 'UE boarding the mobile IAB' may mean a UE connected to the mobile IAB by boarding a moving object equipped with the mobile IAB.

Referring to FIGS. 7A to 7C, a 5GC 701, a first area 720 corresponding to a first tracking area code (TAC), and a second area 730 corresponding to a second TAC are illustrated. The first area 720 may be an area managed by an IAB donor CU 2 721. The IAB donor CU 2 721 may be connected to a DU 1 722 and an IAB donor DU 2 723 through an IP network 740. In addition, the IAB donor CU 2 721 may be connected to an IAB donor CU 3 731 and an IAB donor DU 3 732 of the second area 730 through the IP network 740. In addition, the IAB donor CU 3 731 may be connected to the IAB donor DU 3 732 through the IP network 740, and may be connected to the DU 1 722 and the IAB donor DU 2 723 through the IP network 740.

The IAB donor DU 2 723 may be wirelessly connected to the mobile IAB 724, and the IAB donor DU 3 732 may be wirelessly connected to the mobile IAB 724. In FIGS. 7A to 7C, when signals are transmitted through a wireless connection, a two-way arrow is used to illustrate the wireless connection. The mobile IAB 724 may include an MT 725 and a DU 726 therein.

A case where the connection is changed from an IAB to which the UE is connected to the mobile IAB will be described with reference to FIG. 7A.

The UE1 711 may be in a state of being connected to the DU1 722, IAB donor CU2 721, and 5GC 701 through a path P700 as illustrated in FIG. 7A. Therefore, the UE1 711 may perform communication through the path P700. In this case, the UE1 711 may be in an RRC-connected state or RRC idle state.

In step S710, the UE1 711 may move (or board a moving object such as a vehicle) and access the mobile IAB 724. Then, the UE1 711 may change its path from the existing path P700 to a path P710 via the mobile IAB 724. Accordingly, the path of UE1 711 may be connected to the 5GC 701 through the mobile IAB 724, IAB donor DU2 723, and IAB donor CU2 721.

In FIG. 7A, the case where only the UE1 711 moves is described, but multiple UEs may move together. In other words, multiple UEs may board a specific vehicle (or moving object). In this case, the same manner as the case of UE1 711 described above may be applied.

In case of FIG. 7B, the mobile IAB 724 may move together with the moving object such as a vehicle, and at this time, UEs of passengers riding the vehicle also may move with the vehicle. Accordingly, due to the movement of the vehicle, the mobile IAB 724 may connect to the IAB donor DU3 732 connected to the IAB donor CU3 731, as illustrated in FIG. 7B. Then, the UE1 711 riding the moving object equipped with the mobile IAB 724 may also move from the first TAC area 720 to the second TAC area 730 in step S720. Accordingly, the UE1 711 may change its path from the existing path P710 to a path P720 via the mobile IAB donor CU3 731, IAB donor DU3 732, and mobile IAB 724. Accordingly, the path of the UE1 711 may be connected to the 5GC 701 via the mobile IAB 724, IAB donor DU3 732, and IAB donor CU3 731.

A case of FIG. 7C may correspond to a case where the UE1 711 gets off the moving object. In other words, FIG. 7C illustrates a case where the UE1 711 gets off in step S730. In FIG. 7C, when the UE1 711 gets off, the UE1 711 may access another DU. However, it should be noted that FIG. 7C does not illustrate a procedure for the UE1 711 to access another DU due to limitations in the drawing.

To summarize what has been described above with reference to FIGS. 7A to 7C, the UE1 711 may be in a state of being connected to an IAB DU node which is not a mobile IAB before boarding the moving object equipped with the mobile IAB. At this time, the UE1 711 may be in an RRC idle state or RRC-connected state. When the UE1 711 boards the moving object equipped with the mobile IAB, the UE1 711 may be connected to the mobile IAB. The mobile IAB node may be connected to the 5GC through the IAB donor node and provide services to the UE1 711. When the moving object moves, the mobile IAB may connect to another IAB donor node. Accordingly, the UE1 711 connected to the mobile IAB node may continuously receive services without changing the IAB node. Only the mobile IAB node may move from a specific IAB donor node to another IAB donor node. This operation may be performed until the UE1 711 gets off the moving object equipped with the mobile IAB node.

The terminals (e.g. UEs) boarding the mobile IAB have the same location information as the mobile IAB. Therefore, the present disclosure provides a method for managing terminals boarding the mobile IAB to have the same location as the mobile IAB. In addition, the present disclosure provides a method for the mobile IAB to perform procedures such as a registration procedure and a handover procedure due to a location change on behalf of terminals.

Figure 8:
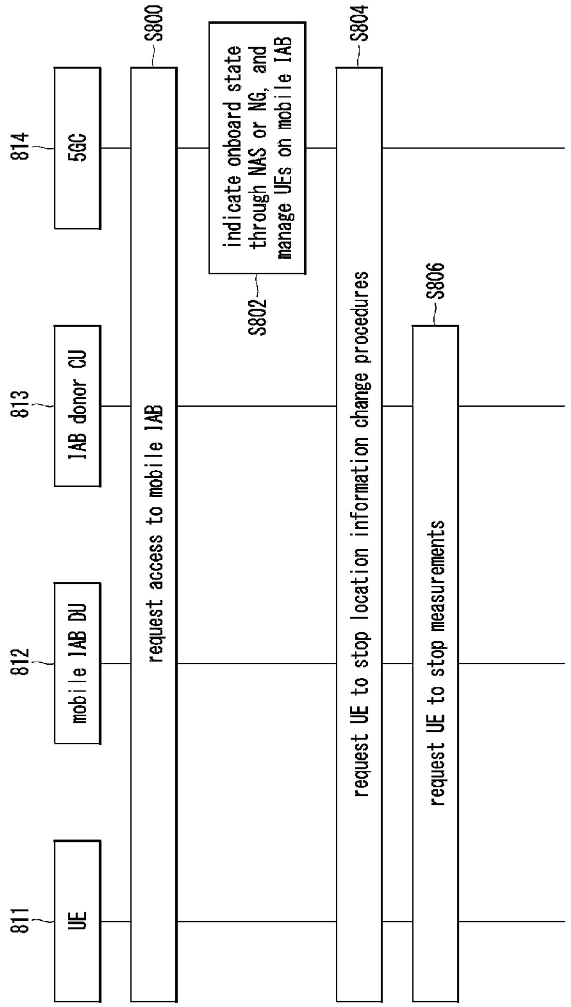
FIG. 8 is a sequence chart illustrating a case where a UE in the RRC idle state boards a mobile IAB.

FIG. 8 is a sequence chart illustrating a case where a UE in the RRC idle state boards a mobile IAB.

Referring to FIG. 8, a UE 811, mobile IAB DU 812, IAB donor CU 813, and 5GC 841 are illustrated. The UE 811 may be a terminal capable of accessing a mobile IAB node or a DU, as previously described in FIGS. 7A to 7C. In addition, the mobile IAB DU 812 may be a DU included in a mobile IAB node, as described in the examples of FIGS. 7A to 7C. Therefore, it should be noted that an MT of the mobile IAB node is not illustrated in FIG. 8.

A 5GC 814 may include various network functions such as AMF, user plane function (UPF), session management function (SMF), policy control function (PCF), and unified data management (UDM). Each function included in the 5GC 814 may be executed on a specific network node or on a specific server, and in the present disclosure, the 5GC 814 will be described as including the network functions exemplified above and other network functions.

In step S800, the UE 811 in the RRC idle state may discover the mobile IAB DU 812 and transmit an access request to the mobile IAB DU 812. The mobile IAB DU 812 may transfer the access request of the UE 811 to the 5GC 814 through the mobile IAB donor CU 813. The access request of the UE 811 may be received by the mobile IAB DU 812 and the AMF that manages the mobility of the UE 811. In addition, the access request may include location information (i.e. UserLocationInformation) of the UE 811. Accordingly, the AMF of the 5GC 814 may receive the access request including the location information (i.e. UserLocationInformation) of the UE 811. Here, the location information of the UE 811 may be transmitted through an NG interface.

In step S802, the AMF of the 5GC 814 may identify the location information (i.e. UserLocationInformation) included in the access request of the UE 811 and location information of the mobile IAB DU 812. Through this, the AMF of the 5GC 814 may identify whether the UE 811 is boarding the mobile IAB DU 812. If it is identified that the UE 811 is boarding the mobile IAB DU 812, the AMF of the 5GC 814 may indicate the UE as an onboard UE in a context of the mobile IAB. In other words, the AMF of the 5GC 814 may store a state of the UE in the context of the mobile IAB as an 'on-board state'.

In step S804, the AMF of 5GC 814 may identify that the mobile IAB is a node with representativeness. Here, a node with representativeness may mean that it has a capability of managing terminals connected to the mobile IAB node as a group, and information on the capability may be information that the mobile IAB node reports in advance to the AMF of the 5GC 814. Based thereon, the AMF of the 5GC 814 may transmit a message indicating to stop changing location information to the UE 811 in order to allow the mobile IAB node to process TA updates or location information changes for the UE 811. Accordingly, when the UE 811 receives the message requesting to stop changing location information, the UE 811 may stop reporting a change in location information of the UE 811. The stopping of the TA update may mean configuring a TA update procedure to be deactivated. In addition, the stopping of location information change reporting may mean configuring reporting of a change in location information to be deactivated.

In step S806, the IAB donor CU 813 may indicate the UE 811 connected to the mobile IAB DU 812 to stop measurement. The stopping of measurement may mean stopping of measurement of a strength of signals received from the mobile IAB DU 812 connected to the UE 811 and measurement of a strength of signals received from adjacent cells. Accordingly, the UE 811 may be configured to stop measuring the strength of the signals received from the cell it is connected to, that is, the mobile IAB DU 812, and stop measuring the strength of the signals received from the adjacent cells until the measurement stop is released, and may be configured not to perform transmission of measurement report messages, based on the indication to stop measurement. Here, stopping of measurement may mean deactivation of a measurement procedure. In addition, the IAB donor CU 813 may indicate the mobile IAB DU 812 to perform measurements on behalf of the UE 811.

Figure 9A:
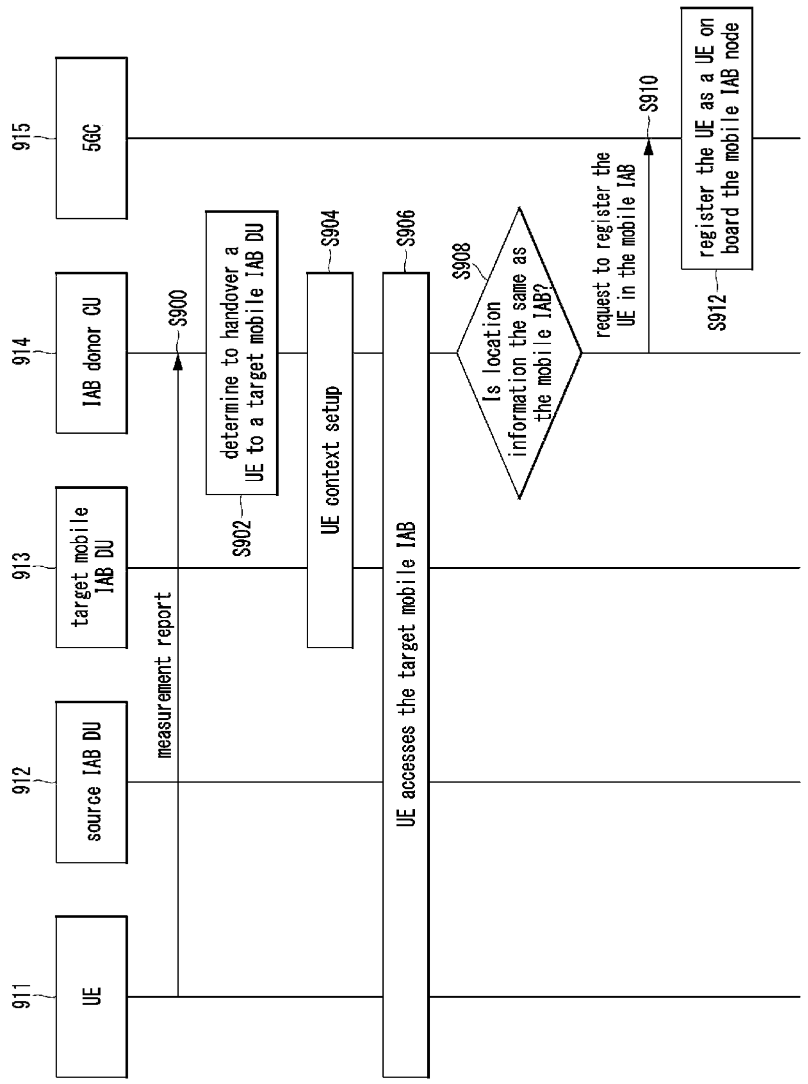
FIG. 9A is a partial sequence chart illustrating a case where a UE in the RRC-connected state accesses a mobile IAB connected to an IAB donor CU from a source UAB DU.
Figure 9B:
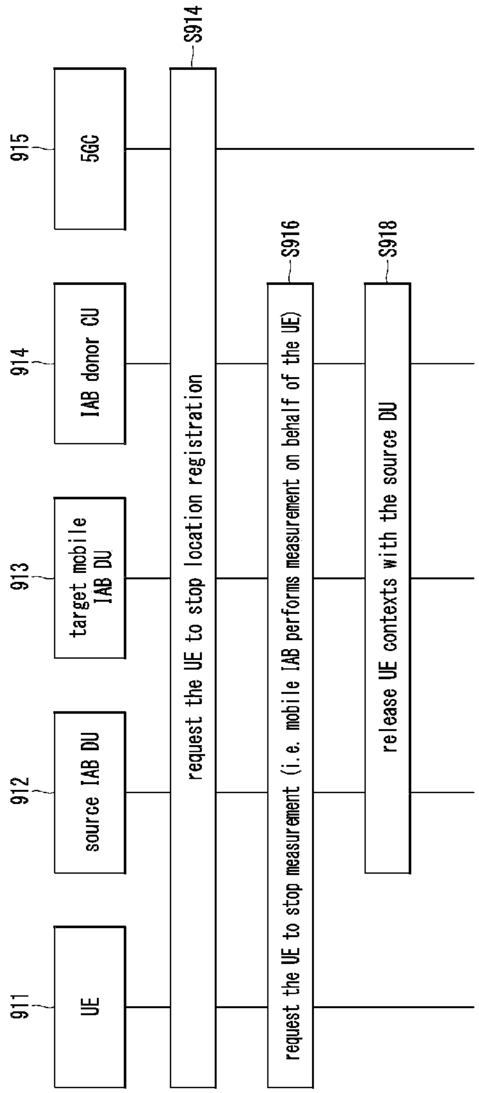
FIG. 9B is a remaining sequence chart illustrating the case where the UE in the RRC-connected state accesses the mobile IAB connected to the IAB donor CU from the source UAB DU.

FIG. 9A is a partial sequence chart illustrating a case where a UE in the RRC-connected state accesses a mobile IAB connected to an IAB donor CU from a source UAB DU, and FIG. 9B is a remaining sequence chart illustrating the case where the UE in the RRC-connected state accesses the mobile IAB connected to the IAB donor CU from the source UAB DU.

Referring to FIGS. 9A and 9B, a UE 911, a source IAB DU 912, a target mobile IAB DU 913, an IAB donor CU 914, and a 5GC 915 are illustrated. In the following description, it is assumed that the UE 911 is connected to the IAB DU 722 as previously described in FIG. 7A. The IAB DU 722 illustrated in FIG. 7A may be the source IAB DU 912 in FIGS. 9A and 9B. A signal flow when the UE 911 connects to the mobile IAB DU 913, that is, when the UE 911 boards a moving object equipped with the mobile IAB node, will be described.

In addition, as previously described in FIG. 8, the 5GC 915 may include various network functions such as AMF, UPF, SMF, PCF, and UDM, and the 5GC 915 according to the present disclosure described below will be described as including these network functions.

Before describing with reference to FIG. 9A, it is assumed that the UE 911 is in an RRC-connected state with to the source IAB DU 912. The IAB donor CU 914 may perform controls on the UE 911 and the source IAB DU 912.

In step S900, the UE 911 in the RRC-connected state may transmit a measurement report message to the IAB donor CU 914, including information on a strength of a signal received from the source IAB DU 912 and/or information on a strength of a signal received from another IAB node, which are measured according to an indication of the IAB donor CU 914 or according to a preset reporting periodicity.

In step S902, the IAB donor CU 914 may determine whether to handover the UE 911 based on the measurement report message received from the UE 911. The handover decision may be performed when handover condition(s) are satisfied. There are various types of handover conditions in the 3GPP specifications, such as Event A1 to Event A6, and a handover may be performed when at least one of these conditions is satisfied. In the present disclosure, description of handover event conditions will be omitted. The exemplary embodiment of FIG. 9A illustrates a case where it is decided to handover the UE 911 to the target mobile IAB DU 913.

In step S904, the IAB donor CU 914 may perform a UE context setup procedure with the target IAB DU 913. In this case, if the target IAB DU to which the UE 911 is handed over is the mobile IAB DU 913, location information of the UE 911 may be configured to be managed as a mobile IAB unit group.

In step S906, the IAB donor CU 914 may indicate the source IAB DU 912 to handover to the target mobile IAB DU 913. Accordingly, the source IAB DU 912 may indicate the UE 911 to access the target IAB DU 913 using a handover command such as an RRC reconfiguration message. Accordingly, the UE 911 may access the target IAB DU 913 through a random access procedure (RACH procedure) in step S906.

In step S908, the IAB donor CU 914 may use the location information of the UE 911 to identify whether the UE 911 is on a moving object equipped with the mobile IAB node. This may be identified through the location information (i.e. UserLocationInformation) of the UE 811, as previously described in FIG. 8. It should be noted that FIG. 9A illustrates the case where the UE 911 is on the moving object equipped with the mobile IAB node. If the UE 911 is not on the mobile IAB node, operations from step S910 may not be performed.

In step S910, if the UE (911) is on the moving object equipped with the mobile IAB node, the IAB donor CU 914 may request the AMF of the 5GC 915 to register the UE 911 in the mobile IAB. According to the present disclosure, the IAB donor CU 914 may manage a context for the UE 911 connected to the mobile IAB and manage a list including the UE 911 connected to the mobile IAB. Accordingly, the IAB donor CU 914 may notify the AMF of the 5GC 915 that the UE 911 has been added to the mobile IAB node.

In step S912, the AMF of the 5GC 915 may add and store the corresponding UE 911 to the list of UEs connected to the mobile IAB node. Through this, the AMF of 5GC 915 may manage the UEs connected to the mobile IAB node. A procedure of FIG. 9B may be performed continuously after the procedure of FIG. 9A.

Referring to FIG. 9B, in step S914, the AMF of the 5GC 915 may indicate the UE 911 to stop a location information change procedure through the IAB donor CU 914. Since the UE 911 is a UE connected to the mobile IAB node, it may move while riding the moving object together with the mobile IAB node. Therefore, the UE 911 may not perform the location information change procedure, and the mobile IAB node may perform it on behalf of the UE 911.

In step S916, the IAB donor CU 914 may transmit a measurement information stop request message to the UE 911. The mobile IAB node may perform the measurement reporting of the UE 911 on board the moving object equipped with the mobile IAB node. This may be because the UE 911 is located within the moving object equipped with the mobile IAB node, so it is generally expected that there will be no significant change in location within the mobile IAB node.

In step S918, the IAB donor CU 914 may release UE contexts configured between the UE 911 and the source IAB DU 912. Through this, the UE 911 may complete the handover procedure from the source IAB DU 912, which is not a mobile DU, to the mobile IAB DU 913, which is a target node.

In the above, the procedure when one UE boards a mobile IAB has been described. Hereinafter, a case of migration by changing a CU to which the mobile IAB is connected will be described.

Figure 10:
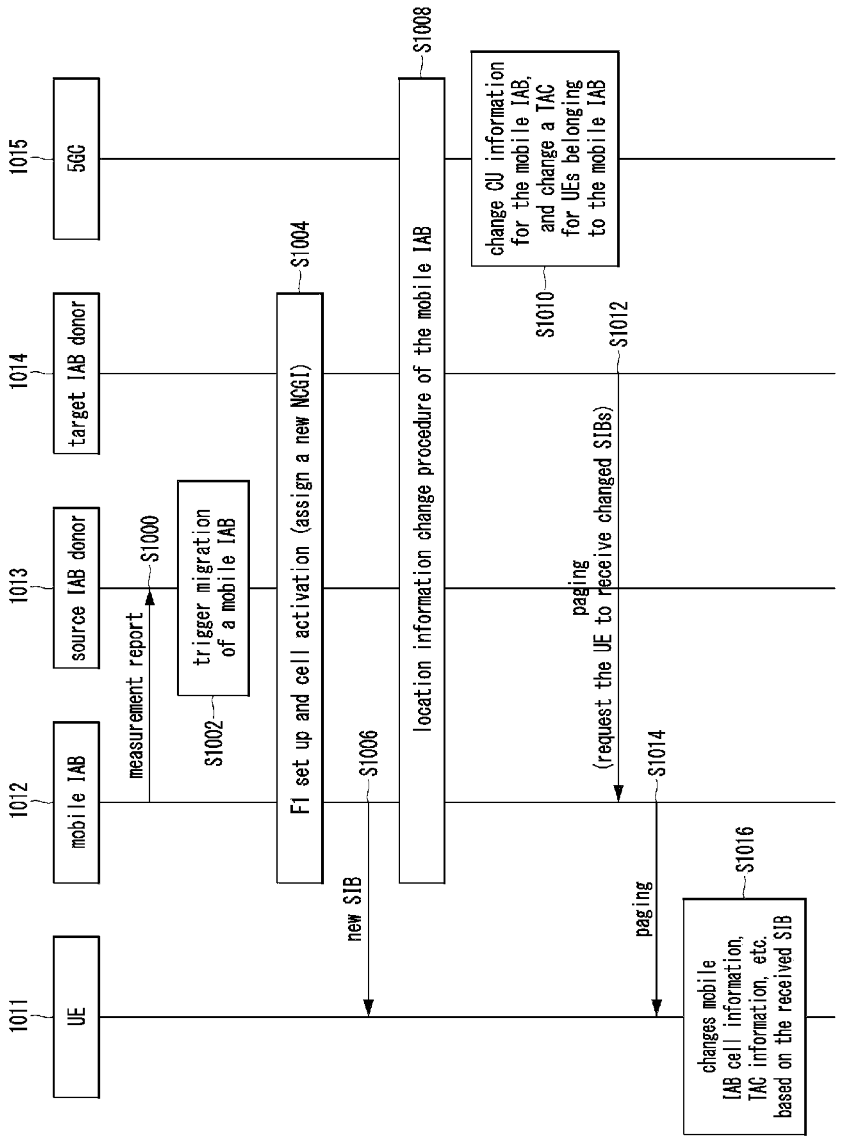
FIG. 10 is a sequence chart illustrating an operation when an IAB to which one or more UEs are connected changes a CU.

FIG. 10 is a sequence chart illustrating an operation when an IAB to which one or more UEs are connected changes a CU.

Referring to FIG. 10, a UE 1011, a mobile IAB 1012, a source IAB donor 1013, a target IAB donor 1014, and a 5GC 1015 are illustrated. In the following description, it is assumed that the UE 1011 is in a state of being connected to the IAB donor CU 721 as previously described in FIG. 7A. A signal flow when the UE 911 connects to the mobile IAB DU 913, that is, when the UE 911 boards a moving object equipped with a mobile IAB node, will be described.

In addition, as previously described in FIG. 8, the 5GC 1015 may include various network functions such as AMF, UPF, SMF, PCF, and UDM, and the 5GC 814 of the present disclosure will be described as including these network functions. In addition, FIG. 10 may correspond to a case where the IAB donor CU is changed as shown in FIG. 7B. It should also be noted that both the source IAB donor 1013 and the target IAB donor 1014 illustrated in FIG. 10 may include CU and DU functionality as illustrated in FIGS. 7A to 7C.

In step S1000, the mobile IAB node 1012 may transmit a measurement report message to the IAB donor 1013, including information on a strength of signals received from the source IAB donor 1013 and/or information on a strength of signals received from other IAB donors, which are measured according to an indication of the source IAB donor 1013 or according to a preset reporting periodicity. Accordingly, the source IAB donor 1013 may receive the measurement report message from the mobile IAB 1012.

In step S1002, the source IAB donor 1013 may determine whether to migrate the mobile IAB 1012 based on the measurement report message received from the mobile IAB 1012. In this case, the migration of the mobile IAB 1012 may be determined based on conditions similar and/or identical to the handover conditions of the UE, as previously described in FIG. 9. In the example of FIG. 10, the source IAB donor 1013 may determine to migrate the mobile IAB

1012 to the target IAB donor 1014. Accordingly, the source IAB donor 1013 may trigger the migration of the mobile IAB 1012.

In step S1004, based on the migration trigger of the mobile IAB 1012 by the source IAB donor 1013, the mobile IAB 1012 and the target IAB donor 1014 may perform F1 setup and may configure new cell information for the mobile IAB 1012. As previously illustrated in FIG. 7B, the case when the migration of the mobile IAB 1012 is determined may correspond to the case when the mobile IAB moves to a region of the target IAB donor 1014. Therefore, it may correspond to the case that the mobile IAB 1012 has moved to a new CU region. As described in FIG. 7B, when the mobile IAB 1012 moves to a new CU region, a TAC may be changed. Accordingly, an NCGI of the mobile IAB 1012 may be changed.

Here, since an NCGI is composed of a base station identifier (gNB id) and a cell identifier (Cell Id), cell information needs to be inevitably changed when entering a new gNB region. A new cell identifier may be assigned locally by the CU of the target IAB donor 1014 or may be assigned from an OAM server. Accordingly, the mobile IAB 1012 may receive the new cell information and system information for TAC information from the CU of the target IAB donor 1014.

In step S1006, the mobile IAB 1012 may configure new system information based on the received information. The mobile IAB 1012 may configure the new system information into a system information block (SIB) and transmit it to the terminal.

In step S1008, the MT of the mobile IAB 1012 may perform a location information change procedure with the 5GC 1015 based on the new location information. The AMF of the 5GC 1015 may receive the location change information from the MT of the mobile IAB 1012.

In step S1010, the AMF of the 5GC 1015 may process the location information change procedure for the mobile IAB 1012, and may locally change TAC information for the UE(s) connected to the mobile IAB 1012.

Meanwhile, in step S1012, the target IAB donor 1014 may indicate the mobile IAB 1012 to transmit paging messages to terminal(s) connected to the mobile IAB 1012. Here, a reason why the paging message is transmitted to the terminal(s) connected to the mobile IAB 1012 is because the location information change procedure of the UE(s) connected to the mobile IAB 1012 before the mobile IAB 1012 migrates has been stopped.

In step S1014, the mobile IAB 1012 may transmit paging messages to the UE(s) connected to the mobile IAB 1012 based on the indication from the target IAB donor 1014. In this manner, by transmitting paging messages to the terminal(s) connected to the mobile IAB 1012, the UE(s) can reflect the changed location information.

The UE(s) receiving the paging messages from the mobile IAB 1012 in step S1014 may perform local update in step S1016 by changing mobile IAB cell information, TAC information, etc. based on the SIB received in step S1006.

Due to the group migration of the mobile IAB, the location information of each UE(s) may be changed locally by the UE(s) and the 5GC 1015. Through this, procedures according to changes in location information may be omitted, thereby reducing signaling procedures.

Figure 11:
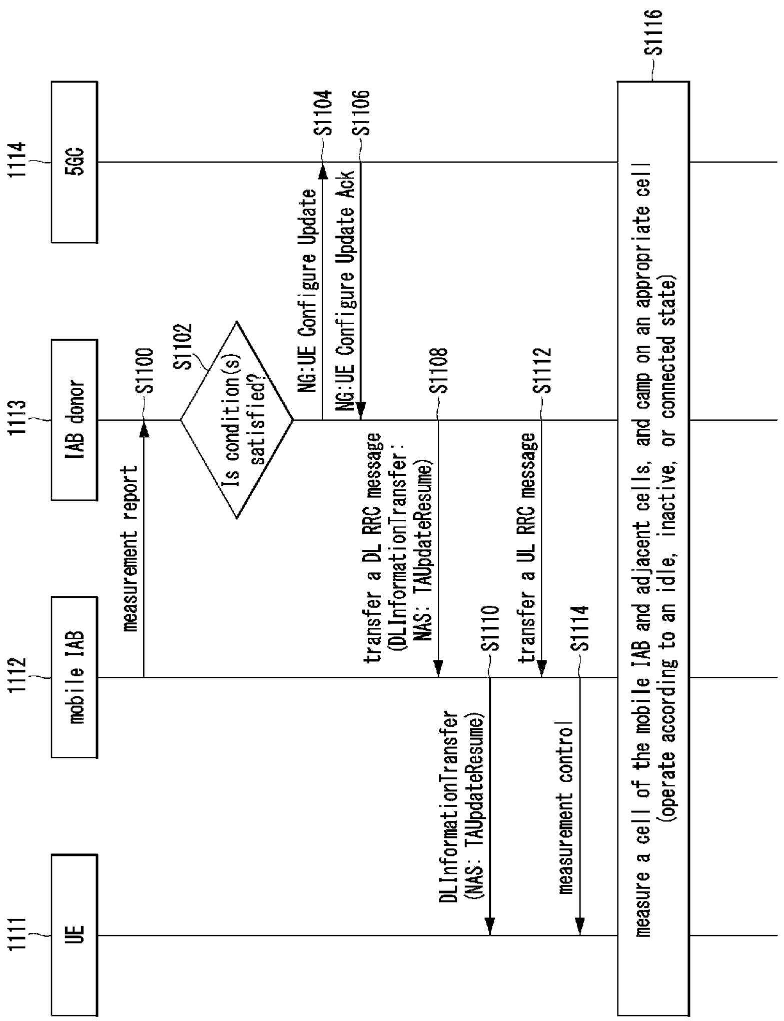
FIG. 11 is a sequence chart illustrating a release procedure from a mobile IAB group when a UE belonging to the mobile IAB group leaves.

FIG. 11 is a sequence chart illustrating a release procedure from a mobile IAB group when a UE belonging to the mobile IAB group leaves.

Referring to FIG. 11, a UE 1111, a mobile IAB 1112, an IAB donor 1113, and a 5GC 1114 are illustrated. In the following description, it is assumed that the UE 1111 is connected to the mobile IAB 724 as previously described in FIG. 7C. The mobile IAB 724 in FIG. 7C may correspond to the mobile IAB 1112 in FIG. 11. In addition, as previously described in FIG. 8, the 5GC 1114 may include various network functions such as AMF, UPF, SMF, PCF, and UDM, and the 5GC 1114 according to the present disclosure will be described as including these network functions.

As previously described in FIG. 8, the UE 1111 on board the mobile IAB 1112 may be in a state of being configured not to perform measurement. Therefore, when the UE 1111 gets off, the state should be released. This procedure according to the present disclosure will be described with reference to FIG. 11.

In step S1100, the mobile IAB 1112 may report measurement information to the IAB donor 1113 on behalf of UE(s) connected to the mobile IAB 1112. Here, the measurement information may be transmitted to a CU of the IAB donor 1113.

In step S1102, the CU of the IAB donor 1113 may identify whether the measurement report satisfies preset conditions based on the measurement report. Here, various conditions, such as when the location of the mobile IAB 1112 is a specific location or when the speed of the mobile IAB 1112 falls below a preset speed, may be configured. In FIG. 11, a case where the preset conditions are satisfied is illustrated. If the preset conditions are not satisfied, procedures from step S1104 may not be performed.

In step S1104, since the preset conditions are satisfied, the CU of the IAB donor 1113 may transmit a UE configuration update message to the 5GC 1114 by using an NG interface in order to release registration of the UE on board the mobile IAB node 1112. Through this, the 5GC 1114 may perform a location information change procedure for individual UEs. In this case, the UE configuration update message may be transmitted to the AMF of 5GC 1114.

In step S1106, the AMF of the 5GC 1114 may transmit a UE configuration update ACK message to the CU of the IAB donor 1113 to resume the location information change procedure for individual UE(s).

In steps S1108 and S1110, the CU of the IAB donor 1113 may transmit a downlink (DL) RRC message to the UE 1111 through the mobile IAB 1112. This message is an RRC message transmitted from the base station to the terminal, and may transparently transmit a NAS message or upper-layer data for downlink information transfer (DIT). In the present disclosure, this message may be a TA update resume (i.e. TAUpdateResume) message as a NAS message, and may be a message indicating to resume the location information change procedure.

In steps S1112 and S1114, the CU of the IAB donor 1113 may individually transmit a measurement control message indicating to resume measurement to the UE 1111 through the mobile IAB 1112 in order to resume measurement of the radio section.

Therefore, when the UE 1111 receives the request to resume the location information change procedure and resume measurement in the steps S1110 and S1114, in step S1116, the UE 1111 may measure cells including the mobile IAB 1112, IAB donor 1113, and other IAB nodes, and camp on an appropriate cell. In this case, the operation of the UE 1111 may differ depending on whether the UE is in an idle state, in an inactive state, or in a connected state.

Figure 12:
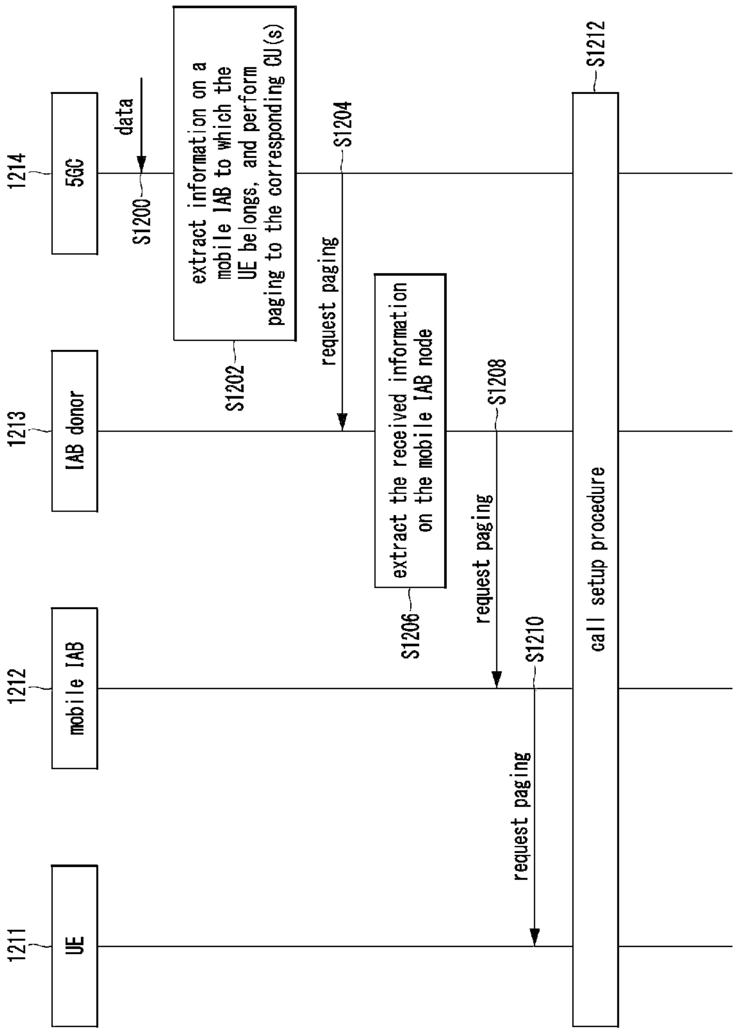
FIG. 12 is a sequence chart illustrating a case in which data is received at a UE belonging to a mobile IAB group and a paging procedure is performed.

FIG. 12 is a sequence chart illustrating a case in which data is received at a UE belonging to a mobile IAB group and a paging procedure is performed.

Referring to FIG. 12, a UE 1211, a mobile IAB 1212, an IAB donor 1213, and a 5GC 1214 are illustrated. In addition, as previously described in FIG. 8, the 5GC 1114 may include various network functions such as AMF, UPF, SMF, PCF, and UDM, and the 5GC 1114 according to the present disclosure will be described as including these network functions.

Generally, paging is required when data is to be received by the UE 1211 in the idle state. Therefore, in order to find the location of the UE 1211 in the idle state, TAC information may be found in the AMF of the 5GC 1214, and a paging signal for the UE 1211 in the idle state may be transmitted to base stations in the corresponding TAC area. If the number of base stations belonging to the TAC area is large, the number of base stations to perform paging increases, which causes an increase in paging costs. The UE(s) managed by the mobile IAB node as a group according to the present disclosure still have the same location information as that of the mobile IAB even in the idle state. Additionally, the mobile IAB is always in the connected state. Therefore, as in the present disclosure, paging for UE(s) managed as a group by the mobile IAB is possible on a mobile IAB basis.

In step S1200, the 5GC 1214 may receive data to be transmitted to the UE 1211 in the idle state.

In step S1202, the AMF of the 5GC 1214 may recognize that the UE 1211 in the idle state is a UE boarding the mobile IAB 1212. Therefore, information on the mobile IAB 1212 may be found. Here, finding information on the mobile IAB 1212 may have the same meaning as finding the IAB donor 1213 to which the mobile IAB 1212 is connected.

In step S1204, the AMF of the 5GC 1214 may transmit a paging request message to the CU of the IAB donor 1213 based on the found information. In this case, the paging request message may include information on the mobile IAB 1212 and information on the UE 1211.

In step S1206, the CU of the IAB donor 1213 may extract the information on the mobile IAB node and information on the UE 1211 based on the paging request message received from the 5GC 1214.

In step S1208, the CU of the IAB donor 1213 may transmit a paging request message to the mobile IAB node 1212 to request paging to the UE 1211.

In step S1210, the mobile IAB node 1212 may transmit a paging signal to the UE 1211 based on the paging request message received from the CU of the IAB donor 1213. Accordingly, the UE 1211 in the idle state may receive the paging signal transmitted by the mobile IAB node 1212.

In step S1212, if the UE 1211 responds to the paging, a call setup procedure may be performed. Since the call setup procedure is a general procedure, detailed description thereof will be omitted in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

transmitting an access request message to a mobile integrated access and backhaul (IAB) based on cell search;

receiving a tracking area (TA) update procedure stop request message from an Access and Mobility Management Function (AMF) of a core network through the mobile IAB; and deactivating a TA update procedure based on the TA update procedure stop request message, wherein the TA update procedure stop request message is received from the AMF to the terminal based on a determination that the terminal is onboard the mobile IAB, and wherein the deactivating of the TA update procedure includes stopping transmission of a signal strength measurement report to the mobile IAB.

2. The method according to claim 1, further comprising:

receiving a TA update procedure resumption message from the AMF through the mobile IAB; and activating the TA update procedure.

3. The method according to claim 1, further comprising:

receiving, from the mobile IAB, a system information block (SIB) in which at least one of a base station identifier (gNB id) or a cell identifier (Cell Id) is changed;

receiving a paging signal from the mobile IAB; and in response to receiving the paging signal, performing a TA update based on the SIB.

4. The method according to claim 3, wherein the performing of the TA update updates at least one of cell information or tracking area code (TAC) information of the mobile IAB.

5. The method according to claim 1, further comprising: in response to receiving a paging signal from the mobile IAB, performing a call setup procedure through the mobile IAB.

6. A terminal comprising at least one processor, wherein the at least one processor causes the terminal to perform:

transmitting an access request message to a mobile integrated access and backhaul (IAB) based on cell search;

receiving a tracking area (TA) update procedure stop request message from an Access and Mobility Management Function (AMF) of a core network through the mobile IAB; and deactivating a TA update procedure based on the TA update procedure stop request message, wherein the TA update procedure stop request message is received from the AMF to the terminal based on a determination that the terminal is onboard the mobile IAB, and wherein the deactivating of the TA update procedure includes stopping transmission of a signal strength measurement report to the mobile IAB.

7. The terminal according to claim 6, wherein the at least one processor further causes the terminal to perform:

receiving a measurement control message indicating to resume message measurement from the mobile IAB; and in response to receiving an indication to resume measurement, activating the measurement procedure.

8. The terminal according to claim 6, wherein the at least one processor further causes the terminal to perform:

receiving, from the mobile IAB, a system information block (SIB) in which at least one of a base station identifier (gNB id) or a cell identifier (Cell Id) is changed;

receiving a paging signal from the mobile IAB; and in response to receiving the paging signal, performing a TA update based on the SIB.

9. The terminal according to claim 8, wherein the at least one processor further causes the terminal to perform:

updating at least one of cell information or tracking area code (TAC) information of the mobile IAB, when performing the TA update.

* * * * *